United States Patent [19]

Banai et al.

[11] Patent Number: 4,842,920

[45] Date of Patent: Jun. 27, 1989

[54] PLASTICS ELEMENTS FOR INORDINATE FILM-FLOW PACKINGS

[75] Inventors: Endre Banai; Tibor Bacsinszky; Vladimir Kormos, all of Budapest; József Molnár, Solymar; Zoltan Nagy, Budapest; Gabon Guruti, Budaors; Csaba Puskas, Budapest, all of Hungary

[73] Assignees: "Hungaria" Muanyagfeldolgozo Vallalat; Melyepitesi Tervezo Vallalat, both of Budapest, Hungary

[21] Appl. No.: 81,498

[22] Filed: Aug. 4, 1987

[30] Foreign Application Priority Data

Aug. 4, 1986 [HU] Hungary .............................. 3364/86
Aug. 4, 1986 [HU] Hungary .............................. 3365/86

[51] Int. Cl.$^4$ .............................................. B05D 3/12
[52] U.S. Cl. ..................................... 428/184; 210/150; 261/94; 261/95; 261/DIG. 72; 428/182; 428/332
[58] Field of Search ................ 428/156, 332; 210/150; 261/94, 95, DIG. 72

[56] References Cited

U.S. PATENT DOCUMENTS

| | | | |
|---|---|---|---|
| D. 232,236 | 7/1974 | La Borde | 261/D72 |
| D. 232,237 | 7/1974 | La Borde | 261/D72 |
| 2,212,932 | 8/1940 | Fairlie | 261/D72 |
| 3,825,119 | 8/1974 | Rost | 261/D72 |
| 4,425,285 | 1/1984 | Shimoi et al. | 261/D72 |
| 4,554,114 | 11/1985 | Guen et al. | 261/D72 |
| 4,668,442 | 5/1987 | Lang | 261/D72 |

FOREIGN PATENT DOCUMENTS

| | | | |
|---|---|---|---|
| 2914079 | of 1980 | Fed. Rep. of Germany | 261/D72 |
| 1405374 | of 1965 | France | 261/D72 |
| 0010104 | of 1977 | Japan | 261/D72 |

*Primary Examiner*—George F. Lesmes
*Assistant Examiner*—James B. Monroe
*Attorney, Agent, or Firm*—Herbert Dubno

[57] ABSTRACT

A spherical packing element for biological film processes which is formed of a flat circular base plate having a central, throughgoing opening therein, a flat and imperforate disk reinforcing plate extending along the opening and lying in a plane perpendicular to the base plate and a plurality of spaced apart, imperforate and mutually parallel circular lamellae perpendicular to both plates, traversing the opening, and spaced apart in the direction of the diameter. The packing element has a surface area of at least 250 m$^2$/m$^3$, and wall thickness of the plates and lamellae are 0.1-2 mm.

7 Claims, 3 Drawing Sheets

PLASTICS ELEMENTS FOR INORDINATE FILM-FLOW PACKINGS

FIELD OF THE INVENTION

Our present invention relates to plastic elements for use in film-flow packings, the elements having central opening and lamellae.

BACKGROUND OF THE INVENTION

So-called film-flow packings have been used in biological waste water purification. The waste water is sprayed through the top of a tower provided with a packing of as large specific surface area as possible. The waste water flows downwardly as a film over the large surface area of the packing, and the microorganisms of the bacteria culture (i.e. the so-called biological film) developed on the packing surface utilize the organic matter present in the waste water for their vital function. A purified waste water is discharged at the bottom of the tower.

The packing elements having a significant effect on waste water purification, because the purification is ensured by the biological film covering the surface of said elements.

Because of their many advantages, synthetic block-like (module-type) packings (generally made of vacuum-formed sheets stacked together) are widely used for biological treatment of sewage.

Such packings, generally comprising numerous open ducts and having a specific surface area 100–200 $m^2/m^3$ specific surface are arranged in orderly manner in the supporting structure.

These block-like packings arranged in orderly manner facilitate the high-speed prepurification of waste water with a high content of organic matter, they do not become clogged, and are insensitive to impulsive loads, but are not suitable for the complete purification of waste water, because the residence time of the waste water is too short and their specific surface area is not sufficient for this purpose.

For this reason, a water purification step, e.g. purification with active sludge had to be used after the film-flow packing to obtain the qualitative parameters of the purified waste water permissible in fresh waters as regulated by various standards.

Thus it has become necessary to produce a synthetic packing which enables effective waste water purification, the cost of investment and energy demand of which much lower than those of the active sludge processes, so that the purified waste water complies with the qualitative parameters set out in the standards. The plastic packings made for this purpose must have at least 250 $m^2/m^3$ specific surface, and should provide sufficiently long residence for the waste water in the film-flow packing as to successfully carry out the decomposition of the organic matter present in the waste water by the deposited micro-organisms.

A further requirement imposed on an packing is the adequate mechanical stability permitting the building of high packing units without intermediate support in such a way that the lowest layer of the packing is capable of carrying the collective weight of the synthetic elements above it, the biological film and downflowing waste water without damage and deformation. In addition, the packing should be light in weight and economical of material.

Another important aspect is resistance of the synthetic material to chemical and corrosive effects; in addition, the packing should be able to be processed in a relatively simple way.

Several synthetic packings are known. However these fulfil only in part above listed requirements.

The most widely used among them is the plastic sheet packing according to the Hungarian Pat. No. 171 178, consisting of synthetic elements provided with open-ended hollow cylindrical fins transverse to the main axis. This packing has a relatively large specific surface area and good mechanical stability, but several drawbacks as well.

The cylindrical elements have anisotropic mechanical characteristics in that the cylinders perpendicular to the axis are mechanically much weaker than in the axial direction, and this is counterbalanced only in part by the fins arranged crosswise. However, the supporting structure statically must be designed for the weak points of the packing unit. On the other hand, in terms of purification technology, the waste water flowing down on the interior of the horizontal cylinders of the packing is not capable of forming a film. Consequently these elements of the packing do not participate in the waste water purification, and are regarded as dead areas. In addition, even those cylinders which participate in purification are not used over their total internal surface area in the waste water purification, process, when their axes are at a certain minimal angle to the horizontal. In this case the water flowing down in the cylinders can accumulate at the bottom without wetting the upper part of the internal surface.

A further drawback of this packing is that although the fins formed on the cylinders for stability reasons theoretically extend the specific surface area of the packing, the biological film developed on the cylinders fills the spaces between the fins under operating conditions, breaking off with difficulty. As a result, in the dynamic balance developed during the continuous operation of the packing, the active specific surfaces readily participating in the waste water purification scarcely exceeds the value which can be achieved with plain, finless cylinders.

Another similar packing is described in the German Patent document DE-PS No. 2 558 986. This packing consists of cylinders with concentric walls, and the outer surfaces of the cylinders are interconnected with lamellae perpendicular to the cylinders.

These elements—due to their construction—have the same disadvantages as the one described in the Hungarian patent, i.e. they have anisotropic mechanical characteristics (they are less resistant to load perpendicular to the axis of the cylinder than to axial loads). Furthermore in terms of purification technology, the internal surface of the horizontal or nearly horizontal pieces of pipe is not wetted by the waste water. Consequently these surfaces cannot participate in the waste water purification.

In the U.K. Pat. No. 1 275 116 again a cylindrical element is described, the mantle of which is perforated, and reinforcing lamellae are provided in the cylinder.

The perforations enable the intensive mixing of the uncharged downflowing waste water, thereby resulting in wetting of the entire surface of the packing. The perforations result in a certain reduction of the specific surface as well.

A mechanical point of view, the packing has the earlier-mentioned diadvantage of the cylindrical form, which is increased by a further weakening by the perforations (also in the direction perpendicular to the axis).

In the German patent document DE-PS No. 2 928 784 a spherical element containing radially curving wall surfaces is described. Ducts are located in the centre of the spheres, allowing as much wetting of the packing as possible.

The radial arrangement of the wall surfaces does not, however allow their arrangement in sufficient density to increase the specific surface without the risk of clogging. The specific surface area for example of 32 m²/m³ of a sphere with 7 cm diameter, is a fairly low value considering the parameters of other known, packings, since at least twice this value is required.

OBJECT OF THE INVENTION

The object of the present invention is to provide plastics elements for film-flow packings of waste water purification plants, which can be used in bulk, i.e. randomly arranged in the packing units and which is uniformly rigid and mechanically stable in all directions, and the specific surface of which exceeds 250 m²/m³.

SUMMARY OF THE INVENTION

According to the invention a spherical element as one of the embodiments is provided comprising a central opening in the center and lamellae consisting of circular base plate, at least one circular reinforcing plate perpendicular to the base plate and circular lamellae parallel with each other, where the central opening is arranged on the base plate and the lamellae at a distance of 1-10, preferably 5 mm from each other.

The lamellae are preferably perpendicular to the reinforcing and base plates.

The wall thickness of the plates and lamellae is 0.1-2, suitably 0.4, mm.

In the annular version the cutout surfaces constitute 30-70% of the total annular surface.

The height and/or diameter of the circular ring are between 10 and 100 mm, the diameter being twice to four times the height, preferably treble of the height.

Wall thickness of the annular version element is between 0.1 and 1 mm, preferably 0.4 mm.

The shape and stability of the elements in terms of waste water purification efficiency are optimal, furthermore the elements can be produced with efficient technology.

Nearly the entire volume of the base plate, reinforcing plate and lamellae of the spherical element participate in formation of the useful surface, thus resulting in highly efficient waste water purification.

The shape and stability of the elements formed from the circular ring are extremely favorable for waste water purification and can be produced in a simple way and at a low cost.

BRIEF DESCRIPTION OF THE DRAWING

The above and other objects, features and advantages of the present invention will become more readily apparent from the following description, reference being made to the accompanying drawing in which.

DESCRIPTION

Figure 1:
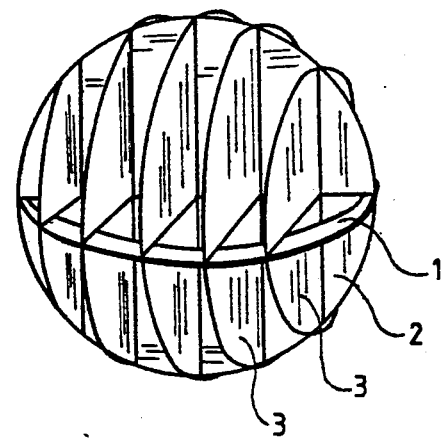
FIG. 1 is an axonometric view of an embodiment of the element according to the invention.
Figure 2:
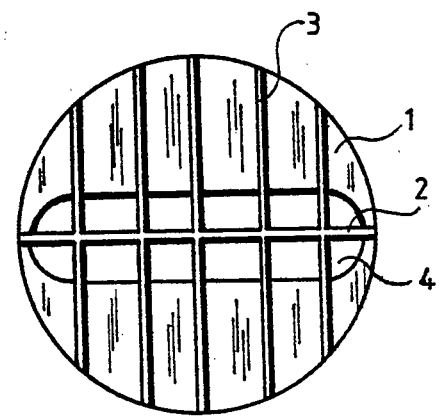
FIG. 2 is the top view of the embodiment shown in FIG. 1.

The element shown in FIGS. 1 and 2 consists of a circular-disk base plate 1, a circular-disk reinforcing plate 2 of the same diameter as base plate 1 and perpendicular thereto and parallel lamellae 3 which are perpendicular to both plates, so that the envelope of the constituents is spherical. Accordingly, the base plate 1, reinforcing plate 2 and lamellae 3 are circular, and can be corrugated to increase the surface area.

Base plate 1 is provided with an opening 4 for the appropriate liquid flow and film formation. In this solution the central opening 4 is shaped as an elongated slot with rounded ends having its major axis in the plane of plate 2.

The element is injection molded in one piece from thermoplastic hard PVC. The diameters of the base plate 1, reinforcing plate 2 and the largest lamellae 3 is 30 mm. The wall thickness of all plates and lamellae is 0.4 mm. The spacing of the lamellae 3 from one another is 5 mm.

The specific surface of above spherical element is 400 m²/m³, and the specific weight is 85 kg/m³.

Communal sewage water containing 200 mg/l BOI$_5$ organic matter under hydraulic load of 2 m³/m³/day was admitted into a 2 m high and 6 m diameter biological purifying column of this packing, whereby 94% purification efficiency was achieved.

Figure 3:
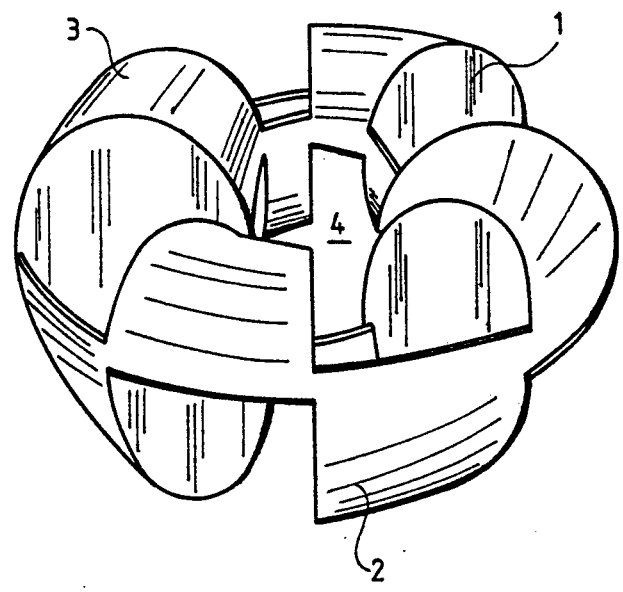
FIG. 3 is an axonometric view of another embodiment of the element according to the invention.
Figure 4:
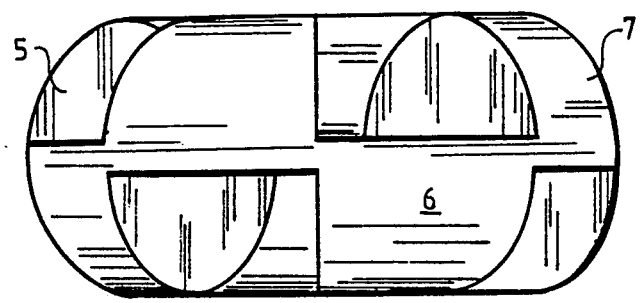
FIG. 4 is the side view of the element shown in FIG. 3.
Figure 5:
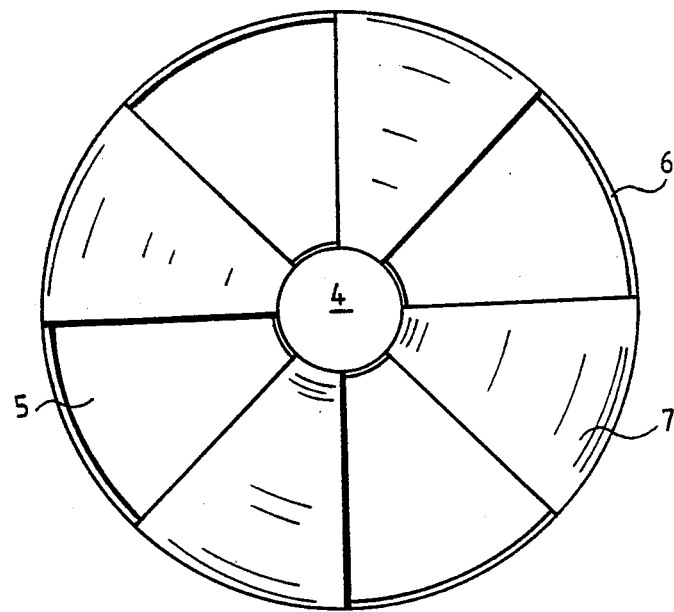
FIG. 5 is a top view of the element shown in FIG. 4.

The synthetic element shown in FIGS. 3 to 5, is annular, provided with cutouts 5 alternately at the top and bottom. The cutouts are arranged along planes surrounding an annular segment, but only a certain part of the annular segment is removed as to reserve the continuity and strength of the element's mantle. In this way the element is composed alternately of lower mantle parts 6 and upper mantle parts 7 between the cutouts 5.

Central opening 4 is arranged in the center of the element given by the shape of the annular surface, i.e. no separate transfer port is required on the element.

This complex configuration has extremely large specific surface. This is due to the fact, that the surface of a circular ring is more than double of the surface of a cylinder within the same volume.

In above solution, the outside diameter of the circular ring is 30 mm, its height 10 mm. Wall thickness is 0.4 mm and the cutouts reduce the total annular surface by 48%.

The specific surface of such element is 350 m³/m³, and the specific weight is 90 kg/m³.

In the course of experiments, the above described annular element was put into a 2 m high and 6 m diameter biological filter tower, and sprayed brewery waste water purified with synthetic blocks of vacuum molded sheets of 200 m²/m³ specific surface was admitted in advance into the filter tower. The waste water contained BOI$_5$ organic matter of 250 mg/l, and its hydraulic load was 2 m³/day.

With the inordinate packing composed of elements according to the invention purification efficiency of the waste water was 92%.

In view of the foregoing, it is evident, that the packing element according to the invention is effectively applicable in biological filters, in the form of inordinate packing. The specific surface and mass of the elements are very favorable, their production is simple and cheap. Dimension, proportions of the elements and size of the cut out surfaces are variable according to the requirements.

What we claim is:

1. A packing element for biological film processes comprising a one-piece synthetic-resin generally spherical body consisting essentially of:
   a flat circular-disk base plate having a circular periphery and formed inward thereof with an elongated slot-shaped opening rounded at its ends and with a major axis along a diameter of the plate;
   a flat circular and imperforate disk reinforcing plate extending along the diameter of said base plate through said opening and lying in a plane perpendicular to said base plate; and
   a plurality of spaced-apart, imperforate, and mutually parallel circular lamellae perpendicular to both said plates, traversing the opening, and spaced apart in the direction of said diameter, said body having a specific surface area of at least 250 $m^2/m^3$.

2. The packing element defined in claim 1 wherein said plates and said lamellae have thicknesses of substantially 0.1 to 2 mm.

3. The packing element defined in claim 1 wherein at least one of said plates and said lamellae is corrugated to increase the surface area thereof.

4. The packing element defined in claim 1 wherein said plates and said lamellae have a thickness of 0.4 mm.

5. The packing element defined in claim 4 wherein said body has a diameter of substantially 10 to 100 mm.

6. The packing element defined in claim 5 wherein said lamellae are spaced apart from each other by about 5 mm, the diameter of said body is about 30 mm, the specific surface area of the element is about 400 $m^2/m^3$ and the specific weight is substantially 85 $Kg/m^3$.

7. A packing element for biological film processes comprising a one-piece synthetic-resin generally spherical body consisting essentially of:
   a flat circular-disk base plate having a circular periphery and formed inward thereof with a throughgoing opening;
   a flat circular and imperforate disk reinforcing plate extending along the diameter of the base plate through the opening and lying in a plane perpendicular to the base plate; and
   a plurality of spaced-apart, imperforate, and mutually parallel circular lamellae perpendicular to both the plates, traversing the opening, and spaced apart in the direction of the diameter, the body having a specific surface area of at least 250 $m^2/m^3$.

* * * * *